(12) United States Patent
Jaradi et al.

(10) Patent No.: US 11,970,126 B2
(45) Date of Patent: Apr. 30, 2024

(54) SCREEN DEPLOYABLE ACROSS OPENING IN VEHICLE BODY

(71) Applicant: Ford Global Technologies, LLC, Dearborn, MI (US)

(72) Inventors: Dean M. Jaradi, Macomb, MI (US); Anil Kalra, Canton, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 756 days.

(21) Appl. No.: 17/071,345

(22) Filed: Oct. 15, 2020

(65) Prior Publication Data

US 2022/0118933 A1    Apr. 21, 2022

(51) Int. Cl.
| | | |
|---|---|---|
| *B60J 7/00* | (2006.01) | |
| *B60J 5/04* | (2006.01) | |
| *B60R 21/013* | (2006.01) | |
| *B60R 21/017* | (2006.01) | |
| *B60R 21/08* | (2006.01) | |
| *B62D 25/04* | (2006.01) | |
| *B60R 21/02* | (2006.01) | |

(52) U.S. Cl.
CPC ............... *B60R 21/08* (2013.01); *B60J 5/04* (2013.01); *B60J 7/00* (2013.01); *B60R 21/013* (2013.01); *B60R 21/017* (2013.01); *B62D 25/04* (2013.01); *B60R 2021/0273* (2013.01)

(58) Field of Classification Search
CPC . B60R 21/06; B60R 7/005; B60R 2021/0004; B60R 2021/0006; B60R 2021/0018; B60R 2021/028; B60R 2021/0273; B60R 21/017; B60R 21/013; B60R 21/08; B62D 25/04; B60J 7/00; B60J 5/04
USPC ........................................................ 280/770
See application file for complete search history.

(56) References Cited

U.S. PATENT DOCUMENTS

| | | | |
|---|---|---|---|
| 3,804,435 A | | 4/1974 | See et al. |
| 5,707,075 A | * | 1/1998 | Kraft .................. B60R 21/08 280/730.2 |
| 6,116,644 A | | 9/2000 | Viano et al. |
| 6,227,601 B1 | * | 5/2001 | LaFrance ............. B60J 1/2011 296/97.4 |
| 6,276,742 B1 | * | 8/2001 | Deng .................. B60J 11/00 296/136.11 |
| 6,505,880 B1 | * | 1/2003 | Castro ................. B60J 7/10 296/147 |
| 6,554,339 B1 | * | 4/2003 | Moore ................. B60R 7/02 296/24.43 |
| 6,604,776 B2 | * | 8/2003 | Edwards ............. B60R 25/016 70/455 |

(Continued)

*Primary Examiner* — James A Shriver, II
*Assistant Examiner* — Hilary L Johns
(74) *Attorney, Agent, or Firm* — Frank A. MacKenzie; Bejin Bieneman PLC

(57) ABSTRACT

An assembly includes a vehicle body including an opening. A track is supported by the vehicle body and extends along the opening. A screen is supported by the vehicle body and is slideable along the track and across the opening between a retracted position and an extended position. The assembly includes a motor supported by the vehicle body and connected to the screen.

20 Claims, 9 Drawing Sheets

(56) References Cited

U.S. PATENT DOCUMENTS

| | | | |
|---|---|---|---|
| 6,672,619 B1 * | 1/2004 | Ennerdal | B60R 21/08 |
| | | | 280/751 |
| 6,817,644 B2 * | 11/2004 | Moore | B60R 7/005 |
| | | | 296/24.43 |
| 7,125,069 B2 * | 10/2006 | Cacucci | B60R 21/02 |
| | | | 280/730.2 |
| 7,464,962 B2 * | 12/2008 | Hakansson | B60R 21/08 |
| | | | 280/749 |
| 7,757,804 B1 * | 7/2010 | Li | B60R 21/34 |
| | | | 180/274 |
| 8,500,163 B2 | 8/2013 | Mallinger et al. | |
| 9,016,717 B1 | 4/2015 | Clauser et al. | |
| 9,428,138 B2 | 8/2016 | Farooq et al. | |
| 10,011,242 B2 | 7/2018 | Liu | |
| 10,272,868 B2 | 4/2019 | Jaradi et al. | |
| 10,399,527 B2 * | 9/2019 | Schütt | B60R 21/08 |
| 10,682,972 B2 * | 6/2020 | Faruque | B60R 21/08 |
| 10,738,520 B2 * | 8/2020 | Cherry | E05D 11/06 |
| 11,332,094 B2 * | 5/2022 | Farooq | B60R 21/213 |
| 2001/0033073 A1 | 10/2001 | Hammond et al. | |
| 2002/0096900 A1 * | 7/2002 | Moore | B60R 7/005 |
| | | | 410/118 |
| 2002/0190513 A1 * | 12/2002 | Svetlik | B60R 21/06 |
| | | | 280/749 |
| 2004/0212217 A1 * | 10/2004 | Cacucci | B60R 21/02 |
| | | | 296/152 |
| 2007/0145775 A1 * | 6/2007 | Smith | B60J 1/2011 |
| | | | 296/146.15 |
| 2017/0197575 A1 * | 7/2017 | Soules | B60R 21/08 |
| 2017/0234048 A1 * | 8/2017 | Ungetheim | E05D 15/30 |
| | | | 49/177 |
| 2018/0371813 A1 * | 12/2018 | Cherry | E05D 11/06 |
| 2019/0054806 A1 * | 2/2019 | Getzschman | B60J 7/1858 |
| 2019/0366967 A1 * | 12/2019 | Faruque | B60R 21/232 |
| 2020/0207301 A1 * | 7/2020 | Lombrozo | B60R 21/34 |
| 2021/0178876 A1 * | 6/2021 | Seitz | B60J 7/143 |

* cited by examiner

SCREEN DEPLOYABLE ACROSS OPENING IN VEHICLE BODY

BACKGROUND

A vehicle may include a vehicle body that includes features that allow an occupant to remove panels of the vehicle for aesthetic and driving appeal. As one example, the vehicle may include a roof panel that may be removed from the vehicle body to uncover openings in the vehicle body. In another example, the vehicle may include doors that may be removed from the vehicle body to uncover openings in the vehicle body.

DETAILED DESCRIPTION

Figure 1:
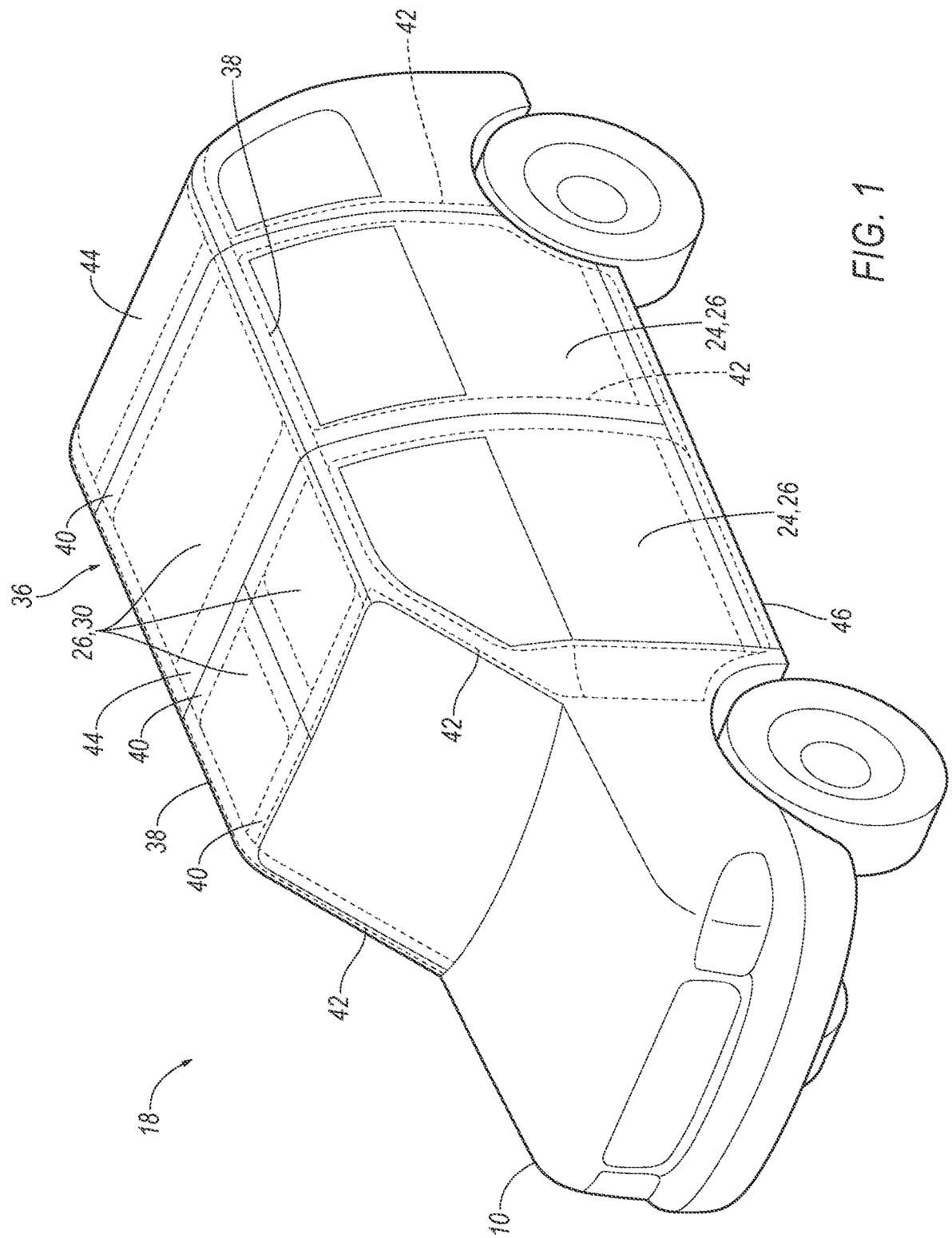
FIG. 1 is a perspective view of a vehicle with removeable door panels and removeable roof panels engaged with the rest of the body.

An assembly includes a vehicle body including an opening, a track supported by the vehicle body and extending along the opening, a screen supported by the vehicle body and slideable along the track and across the opening between a retracted position and an extended position; and a motor supported by the vehicle body and connected to the screen.

The assembly may include a pyrotechnic device connected to the screen.

The assembly may include a spring-loaded spool, the screen being engaged with the spring-loaded spool.

The assembly may include a removeable body panel releasably connected to the vehicle body across the opening.

The assembly may include a sensor programmed to detect the presence and/or absence of the removeable body panel from the opening; and a computer having a processor and memory storing instructions executable by the processor to extend the screen across the opening in response at least to a determination that the removeable body panel is absent from the opening.

The removeable body panel may be a door.

The removeable body panel may be a removeable roof panel.

The assembly may include a second track supported by the vehicle body and extending along the opening and spaced from the track, the opening being between the track and the second track, the screen being slidably engaged with the second track and elongated from the track to the second track.

The vehicle body may include a roof rail, the track being supported by and extending along the roof rail.

The vehicle body includes a second roof rail spaced from and generally parallel to the roof rail, the vehicle body including a roof bow extending from the roof rail to the second roof rail, the opening being between the roof rail and the second roof rail and the screen being supported by the roof bow.

The assembly may include a second track supported by and extending along the second roof rail, the screen being slidably engaged with the second track and elongated from the track to the second track.

The vehicle body may include a pillar and a second pillar spaced from the pillar, the opening being between the pillar and the second pillar, and the screen being supported by the pillar.

The assembly may include a second track supported by the vehicle body and extending along the opening, the vehicle body including a roof rail and a rocker panel spaced from the roof rail, the track extending along the roof rail, and the second track extending along the rocker panel.

The assembly may include where the screen is slidably engaged with the second track and elongated from the track to the second track.

A computer includes a processor and a memory storing instructions executable by the processor to determine an absence of a removeable body panel in an opening of a vehicle body of a vehicle; and extend a screen across the opening in response at least to the determination that the removeable body panel is absent from the opening.

The instructions may include instructions to extend the screen across the opening in response at least to a determination that the vehicle is powered on.

The instructions may include instructions to retract the screen from the opening in response at least to a determination that the vehicle is powered off.

The instructions may include instructions to retract the screen from the opening in response at least to user input through a human-machine interface.

The instructions may include instructions to extend the screen across the opening in response to a determination of a vehicle impact.

The instructions may include instructions to actuate a pyrotechnic device to extend the screen across the opening in response to a determination of a vehicle impact.

With reference to the Figures, wherein like numerals indicate like parts throughout the several views, an assembly 16 for a vehicle 18 is shown. The vehicle 18 includes a vehicle body 10 having an opening 20, a track 14 supported by the vehicle body 10 and extending along the opening 20, a screen 22 supported by the vehicle body 10 and slidable along the track 14 and across the opening 20 between the retracted position and the extended position, and a motor 12 supported by the vehicle body 10 and connected to the screen 22.

Figure 2:
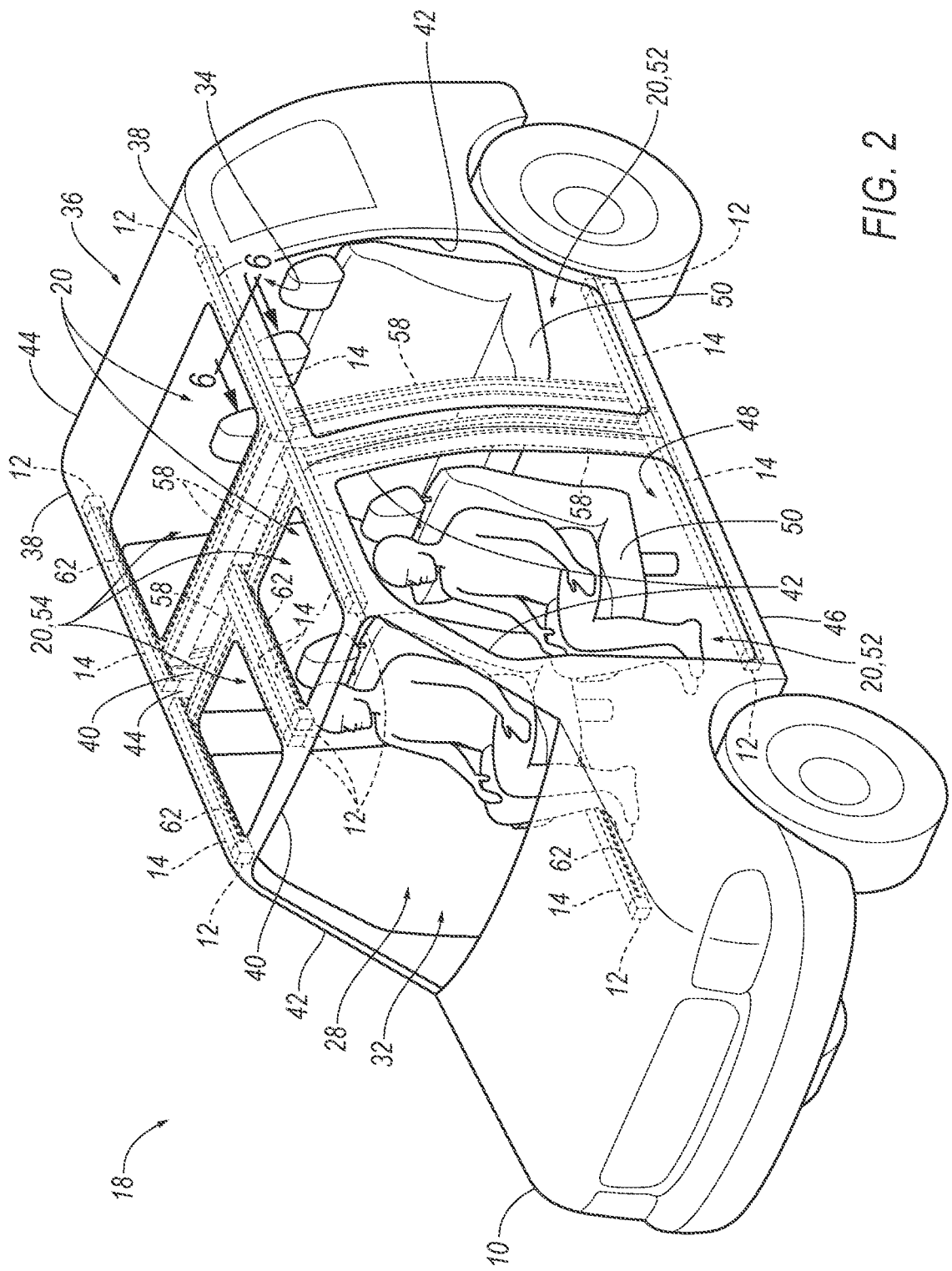
FIG. 2 is a perspective view of the vehicle with the removeable door panels and the removeable roof panels removed from openings in the vehicle body.
Figure 3A:
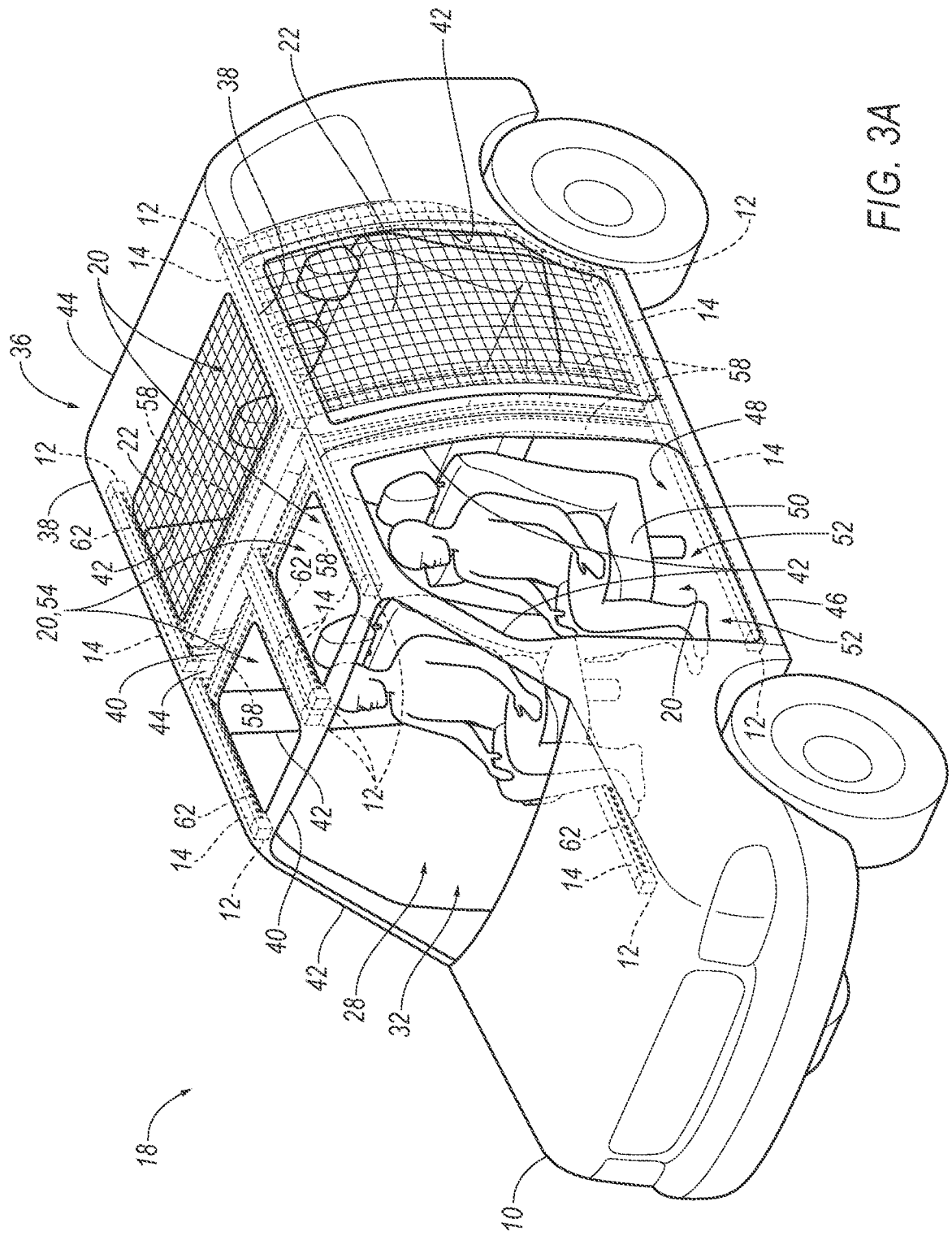
FIG. 3A is a perspective view of the vehicle with screens in extended positions in some of the openings.
Figure 3B:
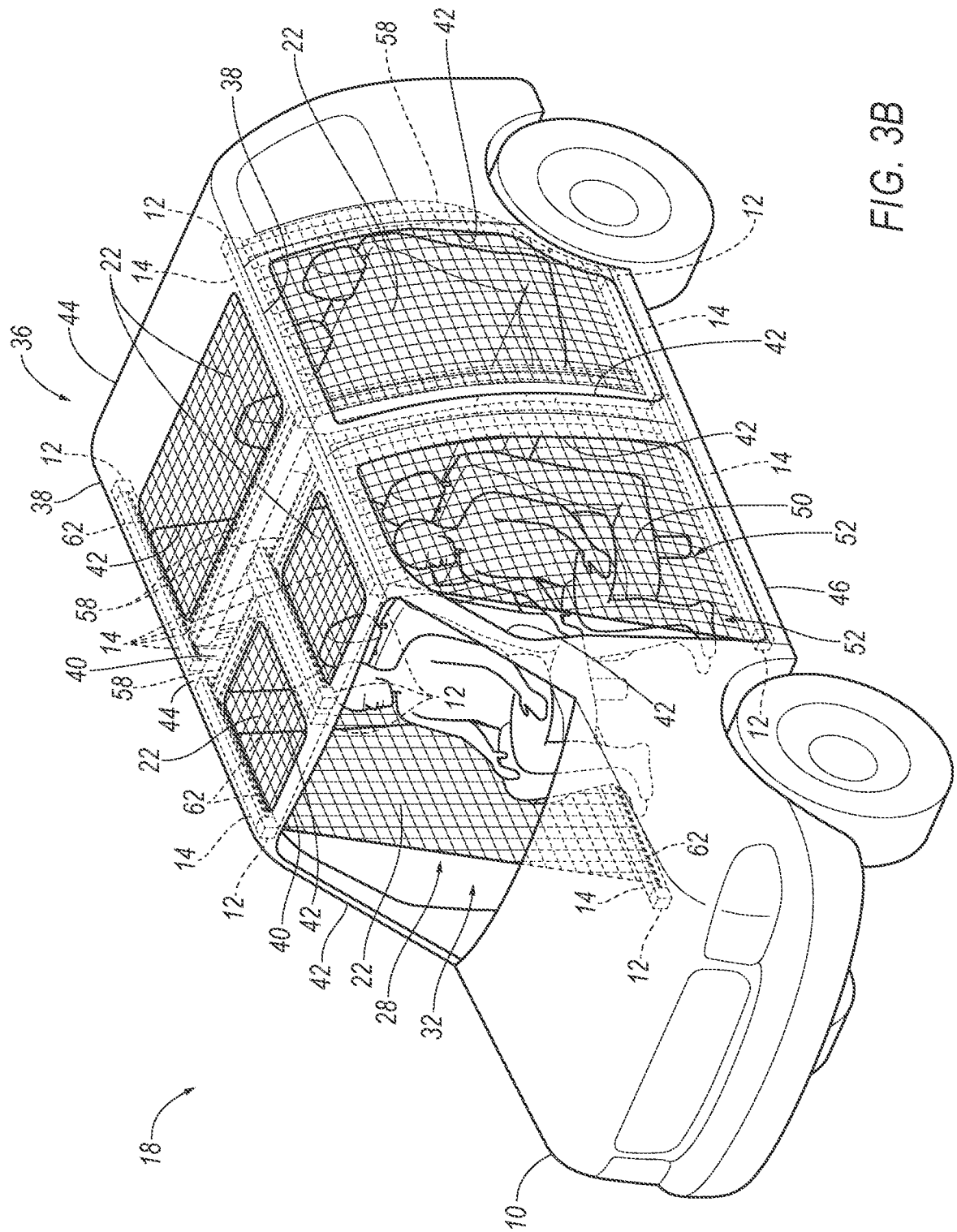
FIG. 3B is a perspective view of the vehicle with screens in extended positions in all of the openings.

Since the motor 12 is supported by the vehicle body 10 and is connected to screen 22, the motor 12 may extend and retract the screen 22 relative to the vehicle body 10 and the opening 20. As an example, the motor 12 may move the screen 22 between the retracted position (as shown in FIG. 2) and the extended position (as shown in FIGS. 3A and 3B). In the event of a vehicle impact, the screen 22 controls the kinematics of the occupant during the vehicle impact. As described further below, the screen 22 may be in the retracted position for ingress and egress of the occupant. As one example, the motor 12 may move the screen 22 to the extended position with the screen 22 remaining in the extended position while the vehicle 18 is driven. As another example, the screen 22 may be moved to the extended position in response to detection of a vehicle impact. In an example, the occupant may manually operate the motor 12 to selectively move the screen 22 between the retracted position and the extended position.

In one example, as shown in the figures, the vehicle body 10 may include removeable body panels 26 at the openings 20. The removeable body panels 26 may be removed from the rest of the vehicle body 10. The removeable body panels 26, for example, may be doors 24 and/or roof panels 30. In such an example, the screen 22 can cover the opening 20 when the removeable body panel 26 is removed from the rest of the vehicle body 10.

The vehicle 18 may be any suitable type of automobile, e.g., a passenger or commercial automobile such as a sedan, a coupe, a truck, a sport utility, a crossover, a van, a minivan, a taxi, a bus, etc. The vehicle 18, for example, may be an autonomous vehicle. In other words, the vehicle 18 may be autonomously operated such that the vehicle 18 may be driven without constant attention from a driver, i.e., the vehicle 18 may be self-driving without human input.

With reference to FIG. 1, the vehicle body 10 may be of any suitable construction, e.g., unibody, body-on-frame, etc. In the unibody construction, the vehicle body 10, e.g., rockers 46, serves as a vehicle frame (not numbered), and the vehicle body 10 (including pillars 42, rockers 46, roof rails 38, roof bows 40, etc.) is unitary, i.e., a continuous one-piece unit. As another example, the vehicle body 10 and frame may have a body-on-frame construction (also referred to as a cab-on-frame construction). In other words, the vehicle body 10 and frame are separate components, i.e., are modular, and the vehicle body 10 is supported on and affixed to the vehicle frame. Alternatively, the vehicle body 10 may have any suitable construction. The vehicle body 10 may be formed of any suitable material, for example, steel, aluminum, etc.

The vehicle body 10 defines a passenger cabin 28 to house occupants, if any, of the vehicle 18. The passenger cabin 28 may extend across the vehicle 18, i.e., from one side to the other side of the vehicle 18. The passenger cabin 28 includes a front end 32 and a rear end 34 with the front end 32 being in front of the rear end 34 during forward movement of the vehicle 18.

Figure 4:
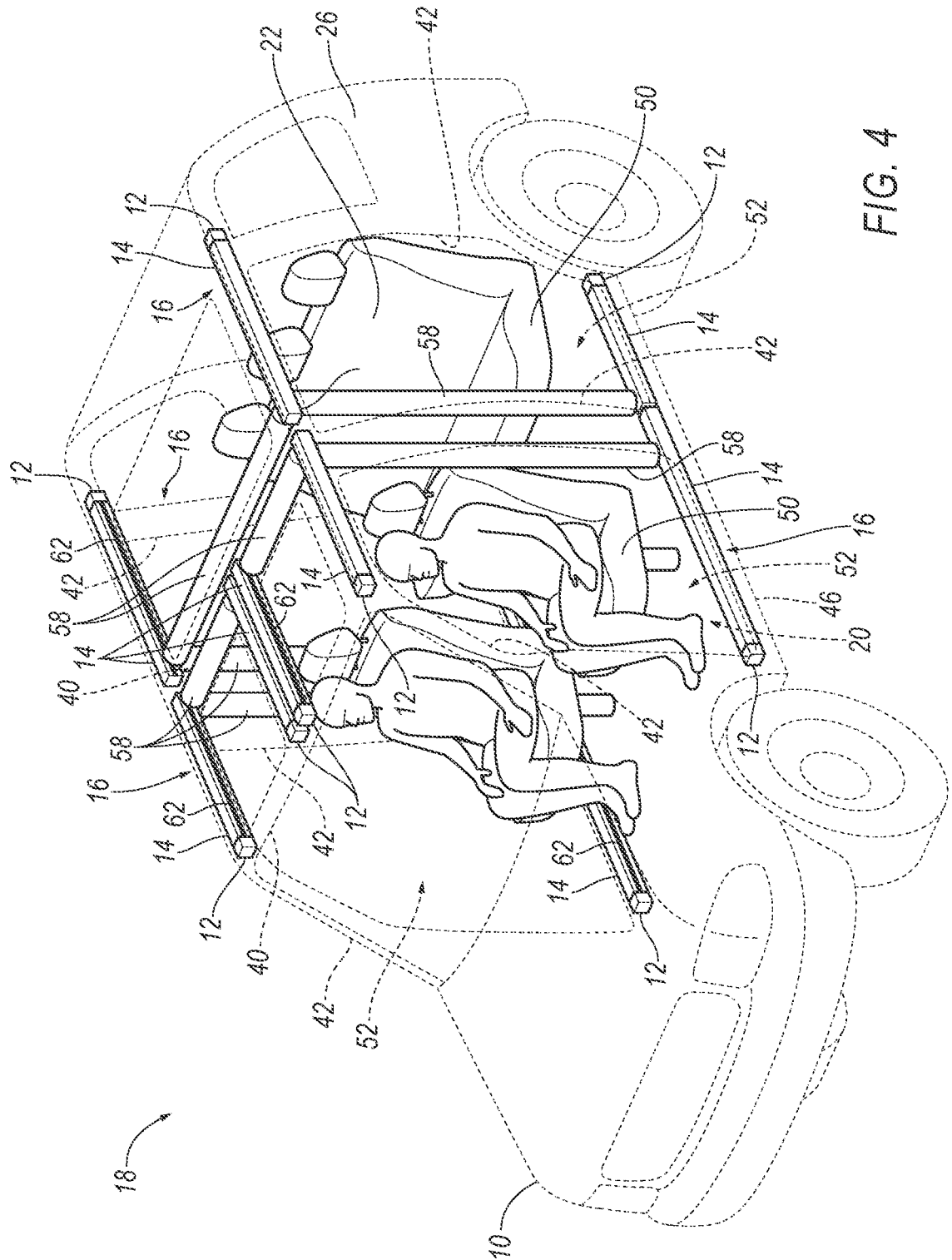
FIG. 4 is a perspective view of the vehicle with some outer surfaces of the vehicle body in hidden lines to show tracks that guide the screens between a retracted position and the extended position.

With reference to FIGS. 2-4, the vehicle 18 includes at least one seat 50. Specifically, the vehicle 18 may include any suitable number of seats 50. As shown in FIGS. 2-4, the seats, are supported by a vehicle floor 48. The seats, may be arranged in any suitable arrangement in the passenger cabin 28. For example, one or more of the seats 50 may be at the front end 32 of the passenger cabin 28, e.g., a driver seat 50 and/or a passenger seat 50, and/or one or more of the seats 50 may be at the rear end 34 of the passenger cabin 28, i.e., a rear seat 50. As shown in the Figures, the rear seat 50 may extend in the cross-vehicle direction across the passenger cabin 28.

With continued reference to FIG. 1, the vehicle body 10 includes a roof 36. The roof 36 may include roof rails 38, one or more roof bow 40, and one or more fixed roof panels 44 and one or more removable roof panels 30.

The vehicle body 10 includes at least two roof rails 38. The roof rails 38 are spaced from one another in a cross-vehicle direction and are generally parallel to each other in the cross-vehicle direction. The roof rails 38 each extend longitudinally along the vehicle body 10, i.e., along a longitudinal axis of the vehicle body 10. In addition to the at least two roof rails 38, the vehicle body 10 may include any suitable number of roof rails 38 spaced from one another and extending longitudinally along the vehicle body 10.

The vehicle body 10 includes at least one roof bow 40. The roof bow 40 extends from one roof rail 38 to the other roof rail 38. The roof bow 40 is irremovably fixed to both roof rails 38. In other words, the roof bow 40 is secured to the roof rails 38 in such a way that removal requires destruction such as cutting, e.g., cutting material and/or welded joints, etc. As an example, the roof bow 40 may be attached to both roof rails 38, e.g., by welding, fasteners, etc. In addition to the at least one roof bow 40, the vehicle body 10 may include any suitable number of roof bows 40 spaced from one another and extending from one roof rail 38 to the other roof rail 38.

The roof 36 includes panels, specifically fixed roof panels 44 and/or removeable roof panels 30. The fixed roof panels 44 are irremovably fixed to one or more roof rails 38 and/or roof bows 40, i.e., secured in a way that removal requires destruction such as cutting, e.g., cutting material and/or welded joints, etc. As an example, the fixed roof panels 44 may be fixed to one or more roof rails 38 and/or roof bows 40 by welding, fasteners, etc. As set forth further below the removeable roof panels 30 are selectively removable from the rest of the vehicle body 10 by choice of the occupants of the vehicle 18.

The vehicle body 10 may include pillars 42 spaced from each other longitudinally along the vehicle body 10. For example, the vehicle body 10 may include an A-pillar and a B-pillar on each side of the vehicle 18 with the A-pillar being spaced from the B-pillar. The A-pillars may extend between a windshield and front doors 24. In other words, the A-pillars may be disposed at the front end 32 of the passenger cabin 28. The vehicle 18 may include additional pillars 42, e.g., C-pillars, D-pillars, etc. The pillars 42 may extend from the roof 36 to the vehicle floor 48, i.e., from the roof rails 38 to the rockers 46. The B-pillars may extend behind front doors 24, e.g., between adjacent doors 24.

The vehicle body 10 includes two rockers 46 spaced from the roof rails 38 below the roof rails 38. The rockers 46 are below the passenger cabin 28. The rockers 46 extend along the vehicle-longitudinal axis. The doors 24 of the vehicle 18 are above the rocker 46 when the doors 24 are in a closed position.

The vehicle floor 48 may define the lower boundary of the passenger cabin 28 and may extend from the front end 32 of the passenger cabin 28 to the rear end 34 of the passenger cabin 28. The vehicle floor 48 may include a floor panel and upholstery on the vehicle floor 48. The upholstery may be, for example, carpet, and may have a class-A surface facing the passenger cabin 28, i.e., a surface specifically manufactured to have a high quality, finished, aesthetic appearance free of blemishes. The vehicle floor 48 may include crossbeams (not shown) connected to the floor panel and to other components of the vehicle body 10.

The vehicle body 10 includes doors 24. The doors 24 are openable for occupants to enter and exit a passenger cabin 28. The roof rails 38 contact a top edge of the doors 24 when the doors 24 are in a closed position. Each door 24 may include a door trim, a door frame, and a door panel. The door trim and the door panel are fixed relative to the door frame. The door trim is inboard relative to the door frame, and the door panel is outboard relative to the door frame. The door 24 includes a window opening completely closed by the window when the window is in a fully raised position. The window opening may be defined by the door trim and door panel on a bottom edge and either by the door 24 circumscribing the window opening or by the vehicle body 10, e.g., the A-pillar, the B-pillar, and the roof rail 38. The door panel faces outboard relative to the passenger cabin 28. As described further below, one or more of the doors 24 may be removeable from the rest of the vehicle body 10, i.e., may be a removeable body panel 26.

With reference to FIGS. 1 and 2, the vehicle body 10 includes at least one opening 20 and at least one removeable body panel 26 releasably attached to the rest of the vehicle body 10 at the opening 20. The removeable body panel 26 at least partially covers the opening 20 when attached to the rest of the vehicle body 10 at the opening 20. As an example, the opening 20 may be a door opening 52 and the removeable body panel 26 may be a removable door 24. As another example, the opening 20 may be a roof opening 54 and the removeable body panel 26 may be a removeable roof panel 30. The opening 20, extends through the vehicle body 10 from the passenger cabin 28 to the exterior of the vehicle 18 with no component therebetween in at least part of the opening 20.

In the example in which the vehicle body 10 includes one or more roof openings 54, the roof opening 54 is between the roof rails 38. The roof opening 54 may extend across a cross-vehicle direction of the vehicle, from one roof rail 38 to the other roof rail 38. Such an example is shown as the roof opening 54 that are in the rear in FIG. 2. As another example, the roof opening 54 may extend across a portion of the cross-vehicle width. For example, the roof opening 54 may be dedicated to the space above one of the seats 50, Such examples are shown as the roof openings 54 that are in the front in FIGS. 2 and 3A.

The door openings 52 may be between the pillars 42. In other words, the pillars 42 are spaced from each other by the door opening 52. The door openings 52 allow for ingress and/or egress of the vehicle 18 by occupants.

With reference to FIG. 1, the removeable body panels 26 are releasably attached to the rest of the vehicle body 10 at the openings 20. When the removeable body panels 26, are attached to the rest of the vehicle body 10, the removeable body panels 26 cover the openings 20, in the vehicle body 10 to enclose the passenger cabin 28. The removable body panels 26, may be released from the rest of the vehicle body 10 to uncover the openings 20, and allow air to pass through the openings 20, and into the passenger cabin 28. The removable body panels 26, may be removable from the rest of the vehicle body 10 by the occupant of the vehicle 18 to allow the openings 20, to be exposed, i.e., uncovered, when operating the vehicle 18.

When attached to the rest of the vehicle body 10 at the roof opening 54, the removeable roof panel 30 has an outer surface exposed to the exterior of the vehicle 18 and an inner surface exposed to the passenger cabin 28. The removeable roof panel 30 may be, for example, a clear or opaque material such as glass or plastic. As another example the removeable roof panel 30 may be metal. The removeable roof panel 30 may be releasably attached, for example, by clips, clamps, and or locks on the rest of the vehicle body 10, e.g., the rest of the roof 36. The clips, clamps, locks, etc., may be manually operated to or may be automatically operated, e.g., electronically operated.

The door 24 is rotatably attached to the rest of the vehicle body 10 at the door opening 52. For example, the door 24 may be rotatably attached to the rest of the vehicle body 10 with hinges. In such an example, the hinges are releasable to selectively release the door 24 from the rest of the vehicle body 10. The hinges may be mechanically releasable or electronically releasable.

With reference to FIGS. 2-5, the vehicle 18 includes one or more retention assemblies 56. The retention assembly 56 includes the screen 22 and the motor 12. The retention assembly 56 may include a spring-loaded spool 58 that spools the screen 22 as the screen 22 is moved toward the retracted position and that pays out the screen 22 as the screen 22 is moved toward the extended position. The vehicle 18 may include any suitable number of retention assemblies 56 at any suitable openings 20 and at any suitable type of opening 20.

The screen 22 has a first end (not numbered) and a second end (not numbered). The first end is operably engaged with the motor 12, described further below. The motor 12 pulls the first end to move the screen 22 toward the extended position and releases the first end to allow the spring-loaded spool 58 to retract the screen 22. The second end may be operably engaged with the spring-loaded spool 58 to move the screen 22 from the extended position to the retracted position. The screen 22 may be mesh. The screen 22 may be of any suitable material, e.g., woven polymer.

The retention assembly 56, e.g., the spring-loaded spool 58, may be supported by any suitable part of the vehicle body 10, e.g., the pillars 42, the roof rails 38, the rockers 46, the roof bows 40, etc. The screen 22 may be stowed on and deployed from the spring-loaded spool 58. Specifically, when the screen 22 extends, the spring-loaded spool 58 rotates in a first direction, and when the screen 22 retracts, the spring-loaded spool 58 rotates in a second direction. The spring-loaded spool 58 includes a spring to bias the spool in the second direction. As an example, when the motor 12 extends the screen 22 to the extended position the spring-loaded spool 58 rotates in the first direction, i.e., opposite the bias of the spring. When the motor 12 releases the screen 22 from the extended position to the retracted position, the spring biases the spring-loaded spool 58 to rotate in the second direction and stow the screen 22. The spring-loaded spool 58 may be of any suitable material, e.g., plastic, metal, composite, etc. The spring-loaded spool 58 may, for example, include an outer housing and a spindle rotatably supported in the outer housing with the spring between the outer housing and the spindle to bias the spindle in the second direction. In such an example, the outer housing includes a slit through which the screen 22 extends and the screen 22 is spooled on and unspooled from the spindle.

The retention assembly 56 includes at least one track 14 supported by the vehicle body 10 and extending along the opening 20. For example, the retention assembly 56 may include two tracks 14 each supported by the vehicle body 10 and extending along the opening 20. In such an example, the opening 20 is between the tracks 14. The track 14 has a first end and a second end spaced from each other. The first end is adjacent the spring-loaded spool 58 and the second end is adjacent the motor 12. The screen 22 is slidable along the tracks 14 and across the opening 20 between the retracted position and the extended position, i.e., the screen 22 is slidable between the First end and the second end of the track 14. The spring-loaded spool 58 extends along the opening 20, perpendicular to the track 14.

As an example shown in the Figures, the track 14 may be along the door opening 52. In such an example, one track 14 may be supported by and extend along one of the roof rails 38, and another track 14 may be supported and extend along one of the rockers 46. As another example shown in the Figures, the track 14 may be along the door opening 52. In such an example, one of the tracks 14 may be supported by and extend along one of the roof rails 38, and another track 14 may be supported by and extend along the other of the roof rails 38. In both examples, the screen 22 is moved between the retracted position to the extended position across the opening 20 and is guided by the track 14 and the second track 14.

Figure 5:
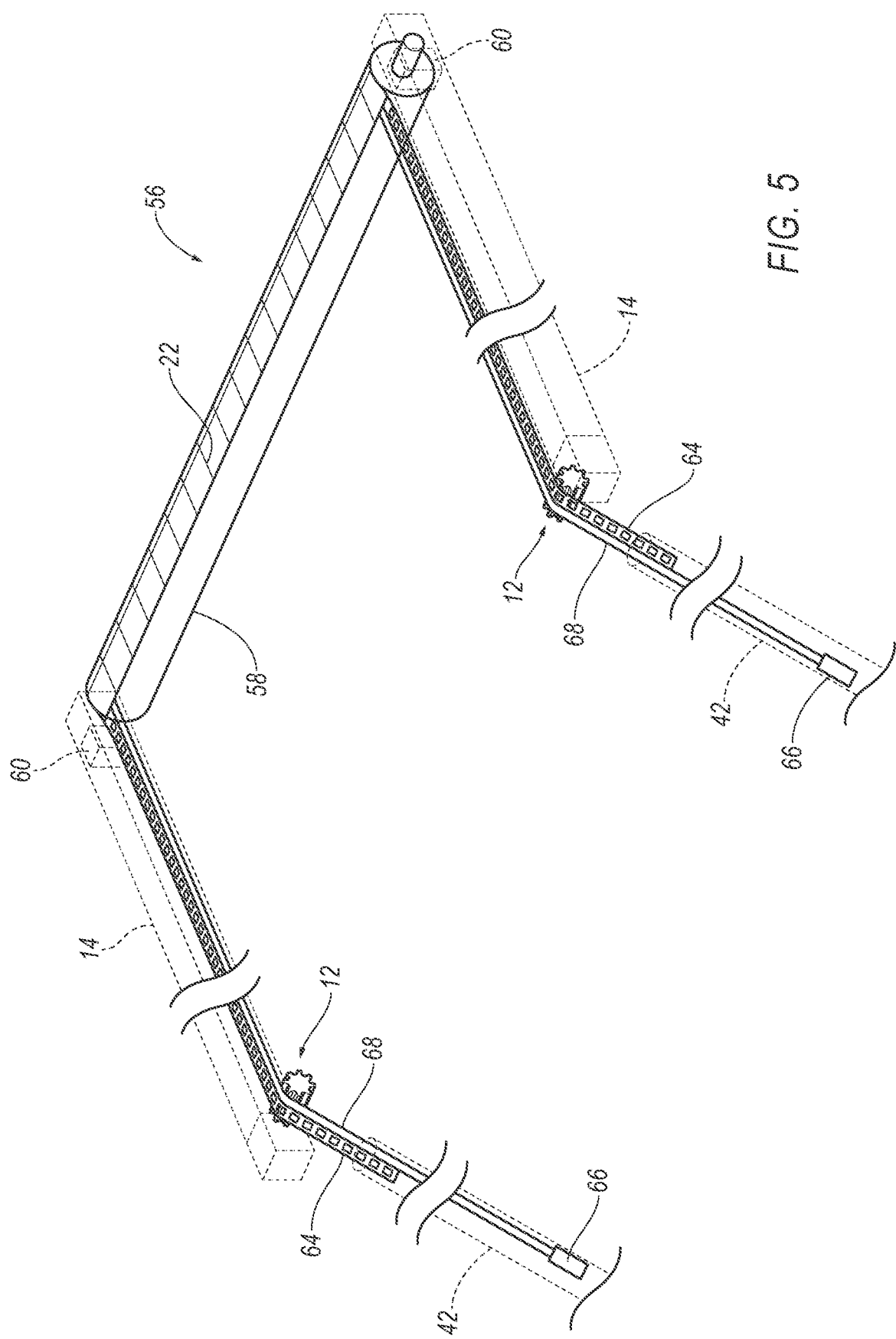
FIG. 5 is a perspective view of a pair of tracks, a screen engaged with the tracks, motors operatively engaged with the screen via chains to move the screen along the tracks, and a pyrotechnic device operatively engaged with the screen via a tether.
Figure 6:
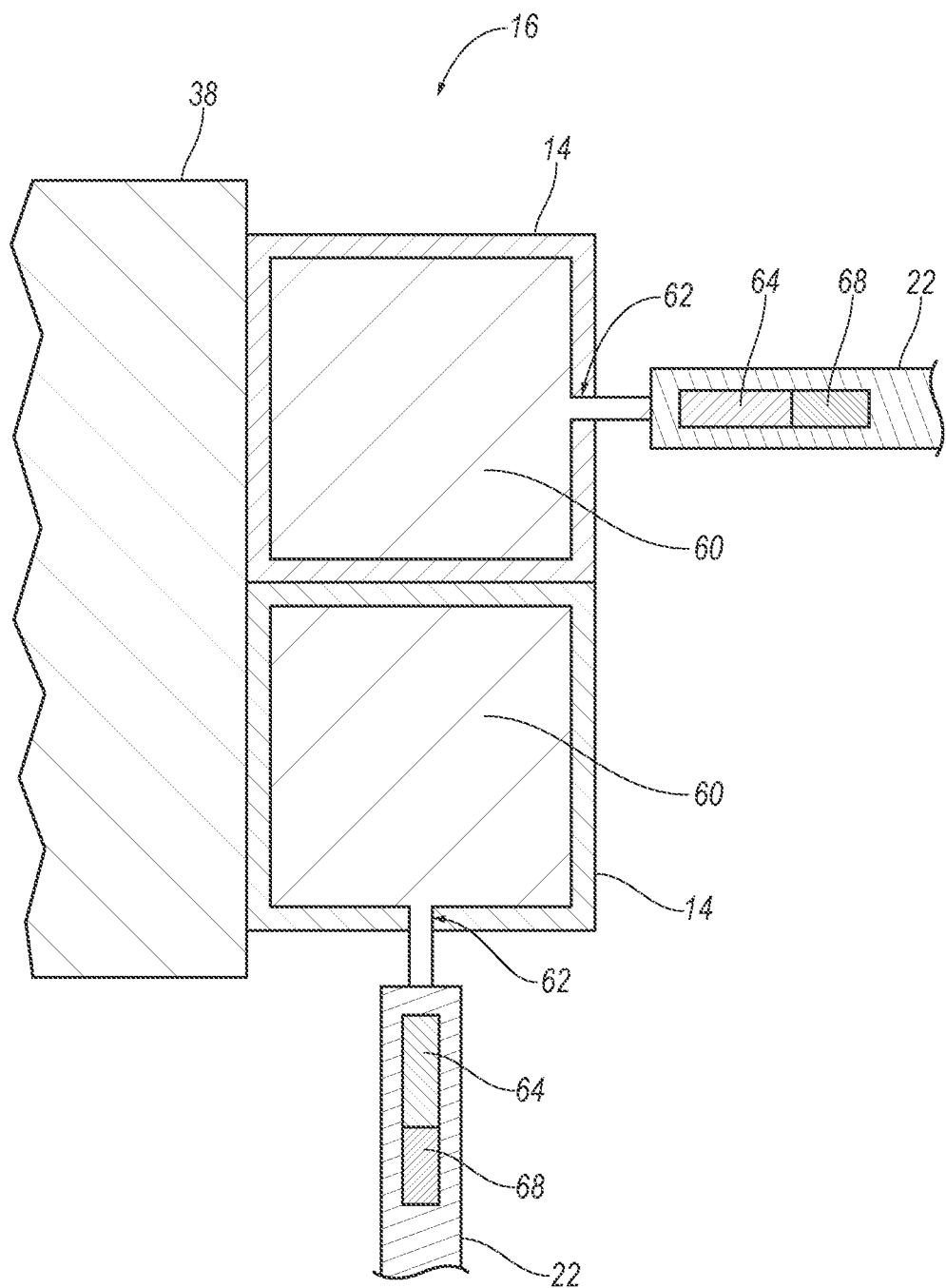
FIG. 6 is a cross sectional view through line 6 in FIG. 3A.

The track 14 may have a slot 62 as shown in FIG. 5. The retention assembly 56 may include a slider 60 slideably engaged with the slot 62 and fixed to the screen 22. The slider 60 may be of any suitable material, such as plastic or metal or the same type of material as the screen 22. The slider 60 is retained in the slot 62 and slides freely within the slot 62. Specifically, when the screen 22 is moved between the retracted and the extended positions slider 60 slides along the slot 62 and anchors the screen 22 to the track 14.

The screen 22 and the spring-loaded spool 58 may be elongated from one track 14 to another track 14. Specifically in the retracted position and the extended position the screen 22 and the spring-loaded spool 58 may be supported by the tracks 14. In the examples shown in the figures, the screen 22 is connected to the tracks 14 by the sliders 60. In another example, the spring-loaded spool 58 may be supported by the tracks 14.

With reference to FIGS. 4 and 5, the motor 12 is supported by the vehicle body 10 and is operably connected to the screen 22. For example, the retention assembly 56 may include a chain 64 The chain 64 is connected to the first end of the screen 22 and is engaged with the motor 12. For example, as shown in FIG. 5, the motor 12 may include a gear that is engaged with the chain 64 to transform rotational movement of the motor 12 into translation movement of the chain 64 and the screen 22. Specifically, the motor 12 rotates in one direction to extend the screen 22 from the spring-loaded spool 58 by overcoming the bias of the spring of the spring-loaded spool 58 and the motor 12 rotates in the other direction to allow the spring-loaded spool 58 to retract the screen 22. The chain 64 is collected and concealed in any suitable area of the vehicle body 10 when the screen 22 is in the extended position. For example, in the example shown in FIG. 5, the chain 64 is collected in the A-pillar.

The motor 12 may be of any suitable type, e.g., a DC motor. The chain 64 may be metal, plastic, composite, or any suitable material. The chain 64 may be any suitable type of chain 64, for example, a roller chain, a flat chain, etc. In other examples the chain 64 may be a cable or rope of any suitable type, e.g., braided or monofilament.

The retention assembly 56 may include a pyrotechnic device 66 and a tether 68. The tether 68 is connected to the pyrotechnic device 66 and to the first end of the screen 22. The pyrotechnic device 66 is disposed across the opening 20 opposite the spring-loaded spool 58. Specifically, the screen 22 is between the spring-loaded spool 58 and the pyrotechnic device 66. The pyrotechnic device 66 is designed to pull the tether 68 toward the pyrotechnic device 66 when the pyrotechnic device 66 is activated, which pulls the screen 22 across the opening 20. During a vehicle impact, the pyrotechnic device 66 may be activated to pull the tether 68 toward the pyrotechnic device 66. Specifically, the pyrotechnic device 66 pulls the tether 68 toward the pyrotechnic device 66 when a vehicle impact is detected and the screen 22 is not in the extended position, i.e., when the screen 22 is in the retracted position or is between the retracted position and the extended position. In such an event, the pyrotechnic device 66 overcomes the spring of the spring-loaded spool 58 and overcomes any resistance provided by the chain 64 and the motor 12, including disengaging and/or fracturing the chain 64 and the motor 12 during extension of the screen 22 by the pyrotechnic device 66 to the extended position.

The pyrotechnic device 66 may be any suitable pyrotechnic device 66 such as a rotary tensioning device, linear tensioning device, or any other suitable pyrotechnic device 66 to move the screen 22 from the retracted position to the extended position. The pyrotechnic device 66 includes a pyrotechnic charge (not shown). The pyrotechnic charge is combustible to produce a gas. The pyrotechnic charge may be formed of a solid mixture of substances that, when ignited, react to produce the gas. For example, the pyrotechnic charge may be formed of sodium azide (NaN3), potassium nitrate (KNO3), and silicon dioxide ($SiO_2$), which react to form nitrogen gas (N2).

The vehicle 18 may include several retention assemblies 56. Each retention assembly 56 may operate independent of the other retention assemblies 56. As one example, the retention assembly 56 may extend across a front one of the door openings 52. In this example, the spring-loaded spool 58 is supported by the B-pillar, i.e., the screen 22 is supported by the pillar 42 on the spring-loaded spool 58. The first end of the screen 22 extends away from the spring-loaded spool 58 in the direction of the rearward end of the vehicle 18 from the retracted position to the extended position. The track 14 extends along the roof rail 38 from the B-pillar to the A-pillar and the second track 14 extends along the rocker 46 panel from the B-pillar to the hinge pillar 42. The retention assembly 56 includes at least two motors 12, a first motor 12 adjacent the track 14, and a second motor 12 adjacent the second track 14. When the motor 12 engages the chain 64 to extend the screen 22, the chain 64 and the pyrotechnic tether 68 are stowed in the A-pillar and the hinge pillar 42.

As another example, the retention assembly 56 may extend across a rear one of the door openings 52. In this example, the spring-loaded spool 58 is supported by the B-pillar, i.e., the screen 22 is supported by the pillar 42 on the spring-loaded spool 58. The First end of the screen 22 extends away from the spring-loaded spool 58 in the direction of the rearward end of the vehicle 18 from the retracted position to the extended position. The track 14 extends along the roof rail 38 from the B-pillar to the c-pillar and the second track 14 extends along the rocker 46 panel from the B-pillar to the c-pillar. The retention assembly 56 includes at least two motors 12, a first motor 12 adjacent the track 14, and a second motor 12 adjacent the second track 14. When the motor 12 engages the chain 64 to extend the screen 22, the chain 64 and the pyrotechnic tether 68 are stowed in the c-pillar.

As another example, the retention assembly 56 may extend across one or more of the roof openings 54. In this example, the spring-loaded spool 58 is supported by the roof bow 40, i.e., the screen 22 is supported by the roof bow 40 on the spring-loaded spool 58. The First end of the screen 22 extends away from the spring-loaded spool 58 in the direction of the forward end or the rearward end of the vehicle 18 from the retracted position to the extended position. The track 14 extends along the roof rail 38 from the B-pillar to the A-pillar and the second track 14 extends along the second roof rail 38 from the B-pillar to the A-pillar. Where the first end of the screen 22 extends away from the spring-loaded spool 58 in the direction of the rearward end of the vehicle 18, the track 14 and the second track 14 extend from the B-pillar to the c-pillar. The retention assembly 56 includes at least two motors 12, a first motor 12 adjacent the track 14, and a second motor 12 6 adjacent the second track 14. When the motor 12 engages the chain 64 to extend the screen 22, the chain 64 and the pyrotechnic tether 68 are stowed in the A-pillars or the C-pillars.

Figure 7:
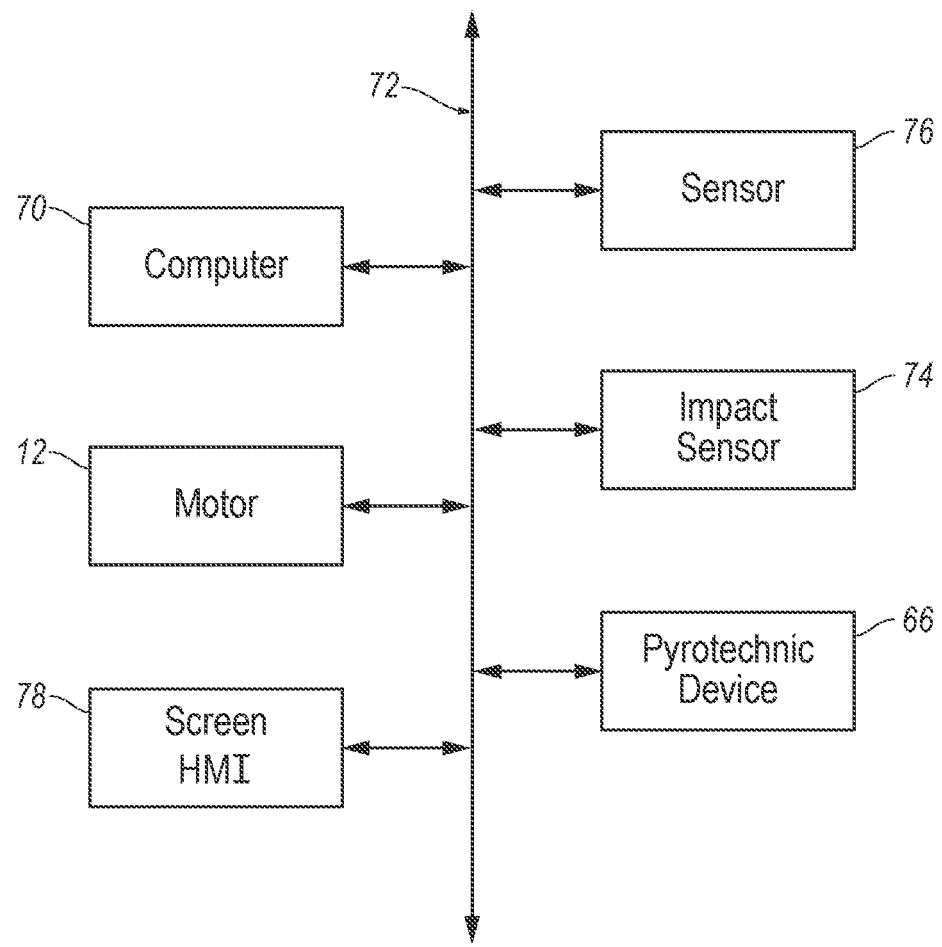
FIG. 7 is a block diagram of components of the vehicle.

With reference to FIG. 7, the vehicle 18 includes a computer 70. The computer 70 includes a processor and a memory such as are known. The memory includes one or more forms of computer readable media, and stores instructions executable by the computer 70 for performing various operations, including as disclosed herein. The computer 70 controls the motor 12 and the pyrotechnic device 66 to control the position of the screen 22 relative to the opening 20. The computer 70 may include or be communicatively coupled to, e.g., via a network of the vehicle 18 such as a communication network 72, more than one processor, e.g., included in components such as sensors, electronic controller units (ECUs) or the like included in the vehicle 18. The computer 70 is arranged for communications on the communication network 72 that can include a bus in the vehicle 18 such as a controller area network (CAN) or the like, and/or other wired and/or wireless mechanisms. Via the communication network 72, the computer 70 may transmit messages to various devices in the vehicle 18 and/or receive messages (e.g., CAN messages) from the various devices, e.g., sensors, an actuator, a human machine interface (HMI), etc. Alternatively, or additionally, in cases where the computer 70 actually comprises a plurality of devices, the communication network 72 may be used for communications between devices represented as the computer 70 in this disclosure. Further, as mentioned below, various controllers and/or sensors may provide data to the computer 70 via the vehicle communication network 72.

With continued reference to FIG. 7, the vehicle 18 may include at least one impact sensor 74 for sensing impact of the vehicle 18. The computer 70 may activate the pyrotechnic device 66, e.g., provide an impulse to a pyrotechnic charge, when the impact sensor 74 senses an impact of the vehicle 18. Alternatively, or additionally to sensing impact, the impact sensor 74 may be configured to sense impact prior to impact, i.e., pre-impact sensing. The impact sensor 74 may be in communication with the computer 70. The impact sensor 74 is configured to detect an impact to the vehicle 18. The impact sensor 74 may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor 74 may be located at numerous points in or on the vehicle 18.

With continued reference to FIG. 7, the vehicle 18 includes a communication network 72. The communication network 72 can include a bus in the vehicle 18 such as a controller area network (CAN) or the like, and/or other wired and/or wireless mechanisms. Via the network, the computer 70 may transmit messages to various devices in the vehicle 18 and/or receive messages (e.g., CAN messages) from the various devices, e.g., sensors, an actuator, a human machine interface (HMI), etc. Alternatively, or additionally, in cases where the computer 70 actually comprises a plurality of devices, the communication network 72 may be used for communications between devices represented as the computer 70 in this disclosure. Further, as mentioned below, various controllers and/or sensors may provide data to the computer 70 via the communication network 72.

With continued reference to FIG. 7, the vehicle 18 may include a panel sensor 76 programmed to detect the presence and/or the absence of the removeable body panel 26 from the opening 20. The panel sensor 76 may be, for example, a proximity sensor that senses the presence and/or absence of the removeable body panel 26 from the opening 20. In such an example, the panel sensor 76 may be a contact sensor, a Hall-effect sensor, etc. The computer 70 may be programmed to extend the screen 22 across the opening 20 in response at least to a determination that the removeable body panel 26 is absent from the opening 20 in the event of a vehicle impact.

With continued reference to FIG. 7, the vehicle 18 may include a human-machine interface, hereinafter referred to as "screen HMI 78", that allows an occupant of the vehicle 18 to control the position of the screen 22. Specifically, the screen HMI 78 controls the motor 12 to control the position of the screen 22 relative to the opening 20. The screen HMI 78 may be, for example, a touch-screen, a knob, lever, etc. The screen HMI 78 is in communication with the motor 12 to control the motor 12. For example, the screen HMI 78 may be in communication through the communication network 72, e.g., through the computer 70.

Figure 8:
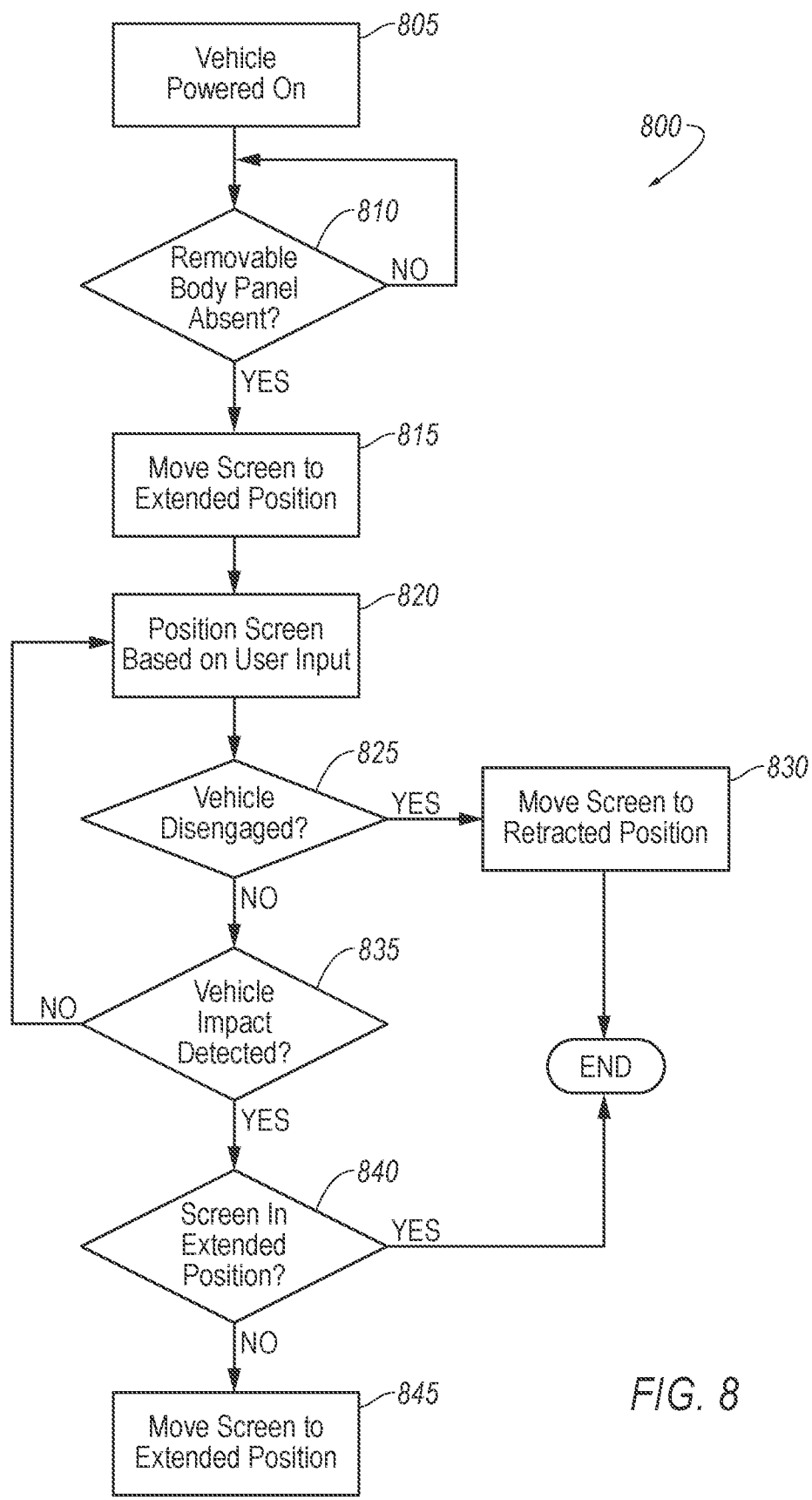
FIG. 8 is a flow chart for a method.

The computer 70 is programmed to perform the method 800 shown in FIG. 8. In other words, the computer 70 has a processor and a memory storing instructions executable by the processor to perform the method 800 shown in FIG. 8. The computer 70 may receive a signal from the occupant so that the occupant can selectively move the screen 22 across the opening 20 between the extended and retracted positions. In the event of a vehicle impact, the impact sensors 74 may detect the impact and transmit a signal through the communication network 72 to the computer 70. The computer 70 may transmit a signal through the communication network 72 to the pyrotechnic device 66. The pyrotechnic device 66 may discharge to move the screen 22 to the extended position.

An example method 800 is shown in FIG. 8. Throughout this text, the use of "in response to," "based on," and "upon determining" indicates a causal relationship, not merely a temporal relationship. With reference to FIG. 8, the memory stores instructions to determine an absence of one of the removeable body panels 26 in one of the openings 20 and to extend the screen 22 across the opening 20 in response at least to the determination that the removeable body panel 26 is absent from the opening 20. The computer 70 may automatically extend the screen 22 to the extended position, i.e., by instructing the motor 12, in response to an initialization action when the removeable body panel 26 is absent from the opening 20. For example, the initialization action may be powering the vehicle 18 on (e.g., operating the ignition), engaging the vehicle 18 in drive (e.g., by moving a gear selector to a drive position), etc. As an example, in block 805, the instructions include instructions to extend the screen 22 across the opening 20 in response at least to a determination that the vehicle 18 is powered on and the removeable panel is absent in block 810. Specifically, the vehicle 18 is powered on and the memory stores instructions to, in response to the vehicle 18 being powered on and detection of the removeable body panel 26 being absent, to move the screen 22 to the extended position, as shown in block 815.

In block 810, the absence of the removeable body panel 26 may be detected by the panel sensor 76, as described above. In block 815, the screen 22 is moved to the extended position by providing instruction to the motor 12 to move the screen 22 to the extended position, as described above.

With reference to block 820, the instructions include instructions to extend and/or retract the screen 22 across the opening 20 in response at least to user input through the screen HMI 78. Specifically, an occupant of the vehicle 18 may provide input to the screen HMI 78 to selectively move screen 22 between the extended and retracted positions. For example, as discussed above, the screen 22 may automatically move to the extended position when the vehicle 18 is powered on. After the screen 22 is moved to the extended position, the occupant may desire to move the screen 22 toward the retracted position or to the retracted position. Accordingly, the occupant may control the motor 12 through the screen HMI 78 to selectively move the screen 22 between the extended and retracted positions.

In blocks 825 and 830, the instructions include instructions to retract the screen 22 to the retracted position when the vehicle 18 is disengaged. The vehicle 18 is disengaged, for example, when the vehicle 18 is disengaged from a drive gear to neutral or park, e.g., the gear shifter is moved from drive to neutral or park. In the example of a door opening 52, this allows the occupant to exit the vehicle 18 through the door opening 52. As another example, the vehicle 18 is disengaged when the vehicle 18 is powered off. Specifically, the screen 22 may be moved to the retracted position in response to the vehicle 18 being disengaged from drive to neutral or park or in response to the vehicle 18 being powered off. Prior to the vehicle 18 being disengaged, the screen 22 remains in the extended position from block 815 or the position selected by the occupant in block 820.

With reference to blocks 835, 840, and 845, the memory may include instructions to extend the screen 22 across the opening 20 in response to a determination of a vehicle impact when the screen 22 is not in the extended position. If vehicle impact is detected in block 835 and the screen 22 is not in the extended position in block 840, then the screen 22 is moved to the extended position in block 845. The vehicle impact may be detected by the impact sensor 74, as described above.

Specifically, the memory includes instructions to actuate the pyrotechnic device 66 to extend the screen 22 across the opening 20 in response to a determination of a vehicle impact. In block 845, the screen 22 is moved to the extended position by actuating the pyrotechnic device 66, as described above.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An assembly comprising:
a vehicle body including an opening;
a first track supported by the vehicle body and extending along the opening;
a screen supported by the vehicle body and slideable along the first track and across the opening between a retracted position and an extended position;
a motor supported by the vehicle body and connected to the screen; and
a removable body panel releasably connected to the vehicle body across the opening.

2. The assembly of claim 1, further comprising a pyrotechnic device connected to the screen.

3. The assembly of claim 1, further comprising a spring-loaded spool, the screen being engaged with the spring-loaded spool.

4. The assembly of claim 1, further comprising:
a sensor programmed to detect the presence and/or absence of the removeable body panel from the opening; and
a computer having a processor and memory storing instructions executable by the processor to extend the screen across the opening in response at least to a determination that the removeable body panel is absent from the opening.

5. The assembly of claim 1, wherein the removeable body panel is a door.

6. The assembly of claim 1, wherein the removeable body panel is a removeable roof panel.

7. The assembly of claim 1, further comprising a second track supported by the vehicle body and extending along the opening and spaced from the first track, the opening being between the first track and the second track, the screen being slidably engaged with the second track and elongated from the first track to the second track.

8. The assembly of claim 1, wherein the vehicle body includes a first roof rail, the first track being supported by and extending along the first roof rail.

9. The assembly of claim 8, wherein the vehicle body includes a second roof rail spaced from and generally parallel to the first roof rail, the vehicle body including a roof bow extending from the first roof rail to the second roof rail, the opening being between the first roof rail and the second roof rail and the screen being supported by the roof bow.

10. The assembly of claim 9, further comprising a second track supported by and extending along the second roof rail, the screen being slidably engaged with the second track and elongated from the first track to the second track.

11. The assembly of claim 1, wherein the vehicle body includes a first pillar and a second pillar spaced from the first pillar, the opening being between the first pillar and the second pillar, and the screen being supported by the first pillar.

12. The assembly of claim 1, further comprising a second track supported by the vehicle body and extending along the opening, the vehicle body including a roof rail and a rocker panel spaced from the roof rail, the first track extending along the roof rail, and the second track extending along the rocker panel.

13. The assembly of claim 12, wherein the screen is slidably engaged with the second track and elongated from the first track to the second track.

14. A computer comprising a processor and a memory storing instructions executable by the processor to:
determine an absence of a removeable body panel in an opening of a vehicle body of a vehicle; and
extend a screen across the opening in response at least to the determination that the removeable body panel is absent from the opening.

15. The computer of claim 14, wherein the instructions include instructions to extend the screen across the opening in response at least to a determination that the vehicle is powered on.

16. The computer of claim 15, wherein the instructions include instructions to retract the screen from the opening in response at least to a determination that the vehicle is powered off.

17. The computer of claim 14, wherein the instructions include instructions to retract the screen from the opening in response at least to user input through a human-machine interface.

18. The computer of claim 14, wherein the instructions include instructions to extend the screen across the opening in response to a determination of a vehicle impact.

19. The computer of claim 14, wherein the instructions include instructions to actuate a pyrotechnic device to extend the screen across the opening in response to a determination of a vehicle impact.

20. An assembly comprising:
a vehicle body including an opening;
a track supported by the vehicle body and extending along the opening;
the vehicle body including a roof rail, the track being supported by and extending along the roof rail;
a screen supported by the vehicle body and slideable along the track and across the opening between a retracted position and an extended position; and
a motor supported by the vehicle body and connected to the screen.

\* \* \* \* \*